United States Patent [19]

Kulczyckyj et al.

[11] Patent Number: 4,484,306
[45] Date of Patent: Nov. 20, 1984

[54] METHOD AND APPARATUS FOR CONTROLLING ACCESS IN A DATA TRANSMISSION SYSTEM

[75] Inventors: Antin U. Kulczyckyj, Cinnaminson, N.J.; Kurt A. Goszyk, Washington Crossing, Pa.

[73] Assignee: Exide Electronics Corporation, Philadelphia, Pa.

[21] Appl. No.: 360,195

[22] Filed: Mar. 22, 1982

[51] Int. Cl.³ ............................................. G06F 15/16
[52] U.S. Cl. ..................................................... 364/900
[58] Field of Search ... 364/200 MS File, 900 MS File; 235/380, 382, 379, 382.5; 340/825.3, 825.31, 825.34

[56] References Cited

U.S. PATENT DOCUMENTS

| | | | |
|---|---|---|---|
| 3,761,883 | 9/1973 | Alvarez et al. | 340/172.5 |
| 3,798,605 | 3/1974 | Feistel | 340/172.5 |
| 3,958,081 | 5/1976 | Ehrsam et al. | 178/22 |
| 3,962,539 | 6/1976 | Ehrsam et al. | 178/22 |
| 4,158,834 | 6/1979 | Nakanishi | 382/69 |
| 4,213,118 | 7/1980 | Genest et al. | 235/382.5 |
| 4,218,738 | 8/1980 | Matyas et al. | 364/200 |
| 4,218,740 | 8/1980 | Bennett et al. | 364/200 |
| 4,227,253 | 10/1980 | Ehrsam | 340/825.3 |
| 4,257,031 | 3/1981 | Kirner | 340/825.3 |
| 4,281,215 | 7/1981 | Atalla | 235/380 |
| 4,296,404 | 10/1981 | Sheldon | 340/825.3 |
| 4,317,957 | 3/1982 | Sendrow | 235/382 |
| 4,375,032 | 2/1983 | Uchida | 235/382 |
| 4,386,266 | 5/1983 | Chesarek | 340/825.3 |
| 4,408,203 | 10/1983 | Campbell | 235/382 |

Primary Examiner—Raulfe B. Zache
Assistant Examiner—David Y. Eng
Attorney, Agent, or Firm—Eugene Chovanes

[57] ABSTRACT

An access control system for use in connection with a data communication system, particularly a data processing system having a computer apparatus, at least one user terminal and a communication link for providing communication between the computer apparatus and the user terminal is comprised of a controller switch and a first programmed computer means. The controller switch is connected to permit transmission of electrical signals between the computer apparatus and the communication link. The first programmed computer means is connected to the controller switch for actuating the controller switch to connect the computer apparatus and the communication link only upon verification by the first programmed computer that an authorized user is operating the user terminal. The access control system also includes an accessor switch and a second programmed computer means. The accessor switch is connected to permit transmission of electrical signals between the user terminal and the communication link. The second programmed computer means is connected to the accessor switch for actuating the accessor switch to connect the user terminal and the communication link only upon verification by the first programmed computer means that an authorized user is operating the user terminal. The second programmed computer means communicates with the first programmed computer means to verify authorized user operation of the user terminal.

12 Claims, 3 Drawing Figures

METHOD AND APPARATUS FOR CONTROLLING ACCESS IN A DATA TRANSMISSION SYSTEM

CROSS REFERENCE

The present application is related to U.S patent application Ser. No. 344,205, filed Jan. 29, 1982.

BACKGROUND OF THE INVENTION

The present invention relates generally to a method and apparatus for controlling access to a data transmission system and, more particularly, to such a method and apparatus for use in connection with controlling user access to a computer or data processing system.

DESCRIPTION OF THE PRIOR ART

Security in data transmission systems including data communication systems, and particularly data processing systems, has grown to be of major concern in recent years due to the ever increasing reliance upon such systems by government, industry and the general public for the storage, manipulation, transmission and presentation of information of all kinds ranging from future business strategies and projected profits to sensitive military secrets. Controlling access to data processing systems is particularly important, not only to insure the continued confidentiality and integrity of the processed or stored information (such as military or trade secrets, financial records and private personnel records) and to reduce the risk of malicious manipulation or erasure of the information, but to prevent the "theft" or misuse of the valuable computing resource itself (i.e., theft of computer time).

One prevalent prior art approach to the problem of controlling access to data processing or computer systems has been to restrict system access to a class of authorized users. The computer is preprogrammed to challenge each attempted system user and only those users who are able to verify that they are authorized users are permitted access to the computer system. Verification is accomplished by issuing each authorized user a unique "password", which may consist of a particular word or number or the like and/or an identification (ID) number, and providing the computer system with a stored listing within its memory of all such passwords and/or ID numbers. The computer system requires each attempted user of a computer terminal to enter or otherwise supply a password and/or ID number, the supplied password and/or ID number is then checked against a stored listing of authorized passwords and/or ID numbers and the user is permitted continued connection and communication with the computer system only if the password and/or ID number supplied appears on the stored listing.

Many variations and improvements of the above-described password type security system have evolved as computer systems have become increasingly sophisticated. While such password type security systems have had some success in limiting access to computer systems, they are not infallible and individuals, who have a good working knowledge of such systems and access to commercially available terminal equipment, have been able to circumvent such security systems to obtain access to valuable computer resources and information stored within the computer systems.

Other prior art approaches to the problem of controlling access to data processing systems have involved the use of highly sophisticated cryptographic equipment. While such cryptographic equipment has proven to be extremely successful, it is relatively expensive to produce, employ and maintain (i.e., management of keys) and is generally commercially available for use only in conjunction with the most sophisticated and complex computer systems.

The present invention provides an efficient and inexpensive apparatus and method for restricting access to data transmission systems, particularly data processing systems, which is readily adaptable for use in connection with virtually all such systems without regard to size or sophistication.

SUMMARY OF THE INVENTION

Briefly stated, the present invention comprises a method and apparatus for controlling access to a data transmission system having a first transmission apparatus, at least a second transmission apparatus and transmission means for providing communication between the first transmission apparatus and the second transmission apparatus. The access control system is provided for controlling the access of the second transmission apparatus to the first transmission apparatus. The access control system comprises controller switch means, which is connected to the transmission means for permitting transmission of electrical signals between the first transmission apparatus and the transmission means, and first programmed computer means connected to the controller switch means for actuating the controller switch means to connect the first transmission apparatus and the transmission means only upon verification by the first programmed computer means that an authorized user is operating the second transmission apparatus. An accessor switch means is connected to the transmission means for permitting transmission of electrical signals between the second transmission apparatus and the transmission means and a second programmed computer means is connected to the accessor switch means for actuating the accessor switch means to connect the second transmission apparatus and the transmission means only upon verification by the first programmed computer means that an authorized user is operating the second transmission apparatus, the second programmed computer means communicating with the first programmed computer means to verify authorized user operation of the second transmission apparatus.

BRIEF DESCRIPTION OF THE DRAWINGS

The foregoing summary, as well as the following detailed description of a preferred embodiment of the invention, will be better understood when read in conjunction with the appended drawings, in which.

DESCRIPTION OF THE PREFERRED EMBODIMENTS

Figure 1:
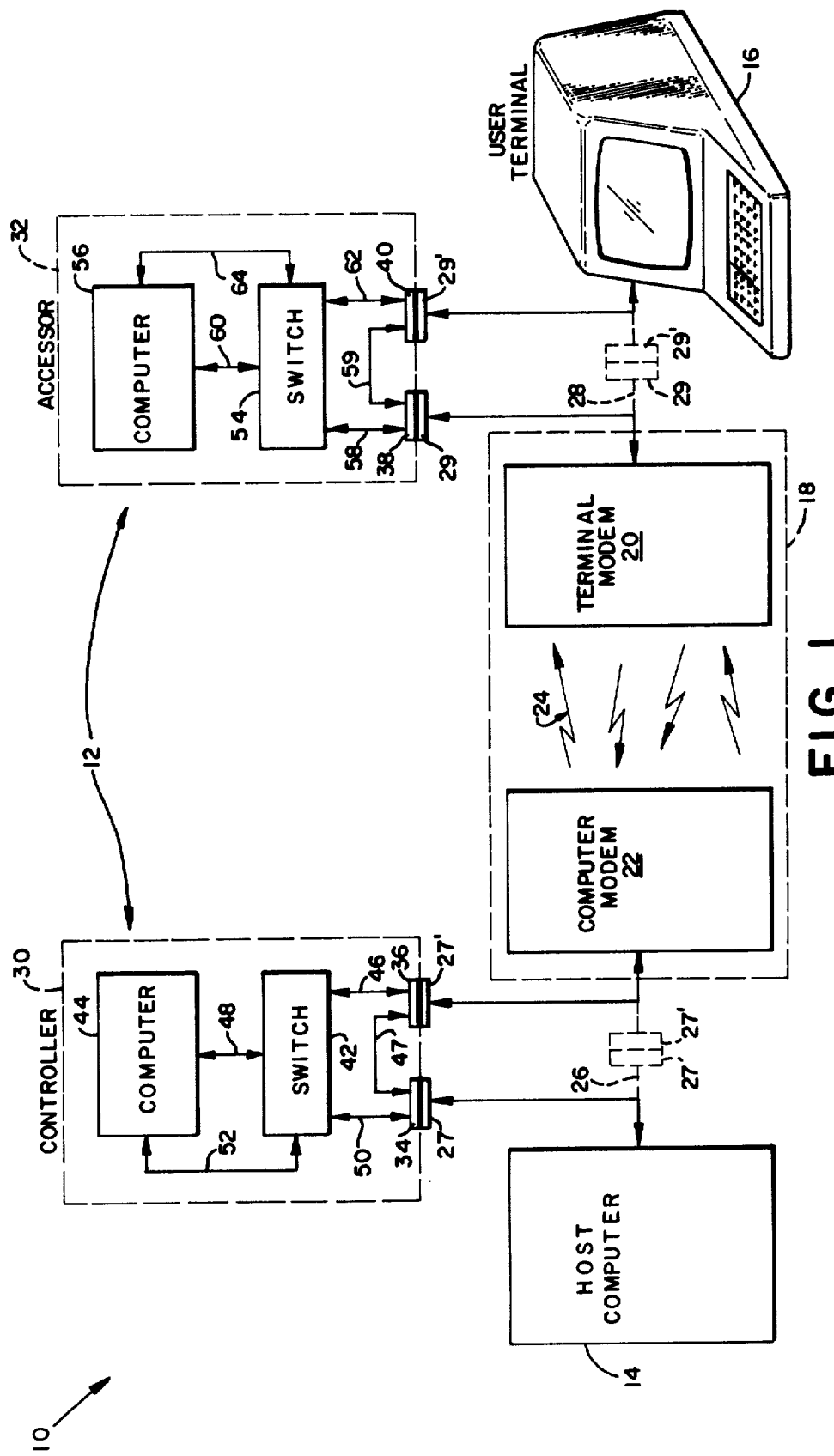
FIG. 1 is a schematic block diagram of a data processing system including the access control system of the present invention.

Referring to FIG. 1, there is shown a schematic block diagram of a data processing system 10 which includes an access control system 12 in accordance with the present invention. The data processing system 10 includes a computer apparatus or host computer 14, which may be any conventional computing apparatus, such as a general purpose main frame computer, special purpose minicomputer or the like. The data processing system 10 also includes at least one standard transmission apparatus or input/output device, such as a user terminal 16 for permitting an operator to send information to and receive information from the host computer 14. As shown on FIG. 1, the user terminal 16 comprises a standard keyboard and cathode ray tube (CRT) display terminal of a type well known in the art and commercially available from a variety of manufacturers. A more detailed description of the structure and operation of the user terminal 16 may be obtained from any of the manufacturers. It should be understood that the present invention is not limited to the particular type of user terminal shown and could also be employed in connection with any other suitable type of input/output device, such as a standard teletype terminal, card reader, paper tape reader, personal or other computer or the like.

The data processing system 10 further includes a communication link or transmission means 18 for providing communication between the host computer 14 and the user terminal 16. In the present embodiment, the user terminal 16 is a remote terminal located at a facility away from the computer apparatus 14. The communication link or transmission means 18 comprises an originate or terminal modem 20 and an answer or computer modem 22, which convert the digital data and control signals from the user terminal 16 and host computer 14, respectively, into suitable analog signals which are then modulated for passage between the modems 20 and 22 via a suitable communications means 24, such as microwave transmission, telephone line or any other conventional communication system. The modems 20 and 22 also receive the modulated signals from, for example, the telephone line generally designated 24, demodulate them and convert them back to digital signals which are then forwarded to the user terminal 16 and host computer 14, respectively. The modems 20 and 22 are of a standard type which are well known in the art and commercially available from various manufacturers. A detailed description of the structure and operation of the modems 20 and 22 is readily available from the manufacturers. It will also be appreciated by those skilled in the art that any other suitable transmission means may be substituted for the modems 20 and 22 and telephone system 24 as shown on FIG. 1 without departing from the scope of the present invention as long as appropriate interfacing is employed.

In a typical prior art data processing system, the host computer 14 is connected to the computer modem 22 by means of a suitable multi-conductor cable (shown in phantom as 26) having standard complementary connector components 27 and 27' each end which interengage (as shown in phantom) to form a complete circuit between the host computer 14 and the terminal modem 22. Similarly, the user terminal 16 is typically connected to the terminal modem 20 by means of a multi-conductor cable (shown in phantom as 28) having suitable standard complementary connector components 29 and 29' on each end which interengage to provide a complete circuit as shown between the user terminal 16 and the terminal modem 20. Also, in the typical prior art system, such multi-conductor cables comprise a 25-conductor cable having suitable RS-232C complimentary connectors on each end thereof. The present invention is particularly suited for installation into such a data processing system employing such RS-232C connectors for connecting the computer apparatus 14 and user terminal 16 to their respective modems 22 and 20.

The access control system 12 of the present invention comprises a generally permanently installed controller apparatus or lock 30 and a small, relatively portable plug-in accessor apparatus or key 32. The controller apparatus 30 and the accessor apparatus 32 are conveniently connected in series between the computer apparatus 14 and its modem 22 and the user terminal 16 and its modem 20, respectively. As shown, the controller apparatus 30 and the accessor apparatus 32 each include suitable RS-232C connectors 34 and 36 and 38 and 40, respectively, which permit the controller apparatus 30 and accessor apparatus 32 to be conveniently installed in any typical existing data processing system by simply disconnecting the existing RS-232C type multi-conductor cable connections (27-27' and 29-29', respectively) and inserting the controller apparatus 30 and accessor apparatus 32 in series in the manner as indicated in FIG. 1.

The controller apparatus 30 is comprised of two primary components, a switch means or controller switch 42 and a first programmed computer means or controller computer 44. A detailed description of the structure and operation of the controller computer 44 will hereinafter be presented. For the present, suffice it to say that the controller computer 44 is a preprogrammed microcomputer system capable of verifying whether the operator of the user terminal 16 is an authorized user and of controlling the actuation of the controller switch 42 to permit access to the host computer 14 upon verification of authorized terminal operators.

Likewise, a more detailed description of the structure and operation of the controller switch 42 will hereinafter be presented. For the present, suffice it to say that the controller switch 42 comprises a programmable switch which is actuated by the controller computer 44 in functionally the same manner as a relay to in effect connect the output of the computer modem 22 to either the controller computer 44 or the host computer 14. The controller switch 42 is connected through interfacing (hereinafter described) directly to the modem 22 by a plurality of conductors or lines 46 (only one of which is shown for clarity). As shown, not all of the lines coming from the modem 22 pass through the controller switch 42, some of the lines 47 (only one of which is shown for clarity) being connected directly between the two connectors 34 and 36. The controller switch 42 may be actuated to connect line 46 to either the controller computer 44 by means of a plurality of lines 48 (only one of which is shown for clarity), or to the host computer 14 by way of a plurality of lines 50 (only one of which is shown for clarity) depending upon which of the two positions the controller switch 42 is actuated. A control line 52 connects the controller computer 44 to the controller switch 42 for permitting the controller computer 44 to actuate the controller switch 42 to connect the computer modem 22 directly to the host computer 14. Whenever the transmission means 18 is inactive, the controller computer actuates the controller switch 42 to connect the computer modem 22 to the controller computer 44. The controller switch 42 remains in this position until actual verification of an authorized user of the user terminal 16 occurs.

Functionally, when the controller switch 42 is actuated into a first position, the lines 46 from the computer modem 22 are connected only to the controller computer 44 via lines 48, the host computer 14 being effectively removed from the circuit (except for lines 47 which are employed to perform normal interfacing between the host computer 14 and the computer modem 22). Correspondingly, when the controller switch 42 is actuated into the second position, the lines 46 from the computer modem 22 are connected to the host computer 14 by way of lines 50, the controller computer 44 being effectively electrically removed from the circuit. In this manner, with the controller switch 42 in the first position, a user terminal 16 attempting to gain access to the host computer 14 is effectively prevented from doing so until such time as the controller computer 44 verifies that the user terminal is authorized to obtain access to the host computer 14 and actuates the controller switch 42 to its second position, thereby completing the circuit between the user terminal 16 and the host computer 14.

The accessor apparatus 32 similarly comprises two primary components; an accessor switch means or accessor switch 54 and a second programmed computer means or accessor computer 56, both of which are structurally and functionally the same as the controller switch 42 and controller computer 44, respectively. The accessor switch 54 is connected by a plurality of lines 58 (only one of which is shown for clarity) through the connection 38/29 directly to the terminal modem 20. As shown, not all of the lines from the terminal modem 20 pass through the accessor switch 54, some of the lines 59 (only one of which is shown for clarity) being connected directly between the two connectors 38 and 40. The accessor switch 54 operates in the same manner as the controller switch 42 to connect the terminal modem 20 to either the accessor computer 56, by means of a plurality of lines 60 (only one of which is shown for clarity) when the accessor switch 54 is in its first position or to the user terminal 16 by means of a plurality of lines 62 (only one of which is shown for clarity) when the accessor switch 54 is actuated into its second position. As with the controller switch 42, the accessor switch 54 is actuated into either one of its two positions by control signals from the accessor computer 56, which are transmitted to the accessor switch 54 by way of line 64.

In order to aid in the understanding of the present invention, a discussion of the operation of the access controller system will now be presented. When an operator of the user terminal 16 attempts to gain access to the host computer 14, a carrier signal is initially sent from the computer modem 22 through the telephone line 24 to the terminal modem 20 to which the terminal modem 20 responds with its carrier to establish communication. At this point in time, the controller switch 42 is in its first position, whereby signals from the computer modem 22 are transmitted directly to the controller computer 44 and the host computer 14 is effectively isolated from such signals. Upon receipt of the carrier signal, the controller computer 44 transmits an initial message signal from its memory through the controller switch 42 and communications link 18 to the accessor apparatus 32. The initial message signal transmitted by the controller computer 44 is in the form of an ASCII code message and serves as a first check to determine whether or not an accessor apparatus 32 is present in the circuit and properly connected to the other end of the terminal modem 20. If an accessor apparatus 32 is present and properly connected as shown, the ASCII code message is received by the accessor computer 56 and is echoed or retransmitted back to the controller computer 44. If no accessor apparatus 32 is present in the system, the ASCII code message from the controller computer 44 is printed out on the user terminal screen to indicate to the terminal operator that the operator is not authorized to access the host computer 14 and the telephone connection between the modems 20 and 22 is severed, in a manner well known in the art.

If an accessor apparatus 32 is present and the ASCII code message is properly echoed back to the controller computer 44, the controller computer 44 then generates a signal in the form of a "question" comprised of a random sequence of characters or numbers. The random question is then transmitted to the accessor computer 56. To provide additional security, the individual characters of the randon question may also be transmitted to the accessor computer 56 at a baud rate, varying on a character by character basis. The accessor computer 56 receives and stores each of the random question characters received from the controller computer 44.

Both the controller computer 44 and the accessor computer 56 are preprogrammed with the exact same basic algorithim to provide a unique access code for the system. The controller computer 44 and the accessor computer 56 both simultaneously operate on the random question characters to perform various manipulations utilizing the internal registers of the respective computers in accordancae with the preprogrammed algorithim to each generate a unique "answer", which is comprised of a similar signal in the form of a sequence of characters. Since the random question and the algorithim are the same for both computers, both computers 44 and 56 generate the exact same unique answer (assuming that no outside interference is present in the system). The use of a random question and the generation of the unique answers provides enhanced security over the use of a fixed or stored answer, as was done by prior art systems.

Once the generation of the two answers has been completed, the accessor computer 56 transmits its unique answer to the controller computer 44. Again, the answer from the accessor computer 56 may be transmitted at a variable baud rate on a character by character basis to provide additional security. The controller computer 44 receives and stores the answer from the accessor computer 56 and thereafter makes a detailed bit by bit comparison of the accessor computer answer with its own internally generated answer. The number of incorrect bit comparisons is tabulated by the controller computer 44. If no errors occur during the comparison, the controller computer 44 actuates the controller switch 42 to connect the host computer 14 to the computer modem 22. Simultaneously, the controller computer 44 sends a signal to the accessor computer 56 indicating that no errors were found during the comparison and the accessor computer 56 actuates the accessor switch 54 to connect the user terminal 16 to the terminal modem 20. In this manner, the controller computer 44 and the accessor computer 56 are effectively electrically removed from the circuitry, and the communication path between the user terminal 16 and the host computer 14 is completed, thereby allowing normal usage of the data processing system 10 without a need for further verification. With the controller computer 44 and access computer 56 removed from the circuitry during transmission of data between the host computer 14 and user terminal 16, no transients or other interference is introduced from the access control system 12 into the data processing system. In addition, both the controller computer 44 and the accessor computer 56 are free to perform other functions, such as self-diagnostics, without interfering with the user terminal 16, host computer 14 or the communication link 24.

If errors are encountered during the comparison of the two answers, the controller computer 44 does not actuate the controller switch 42 and the user terminal 16 is effectively prevented from accessing the host computer 14. A variable stall feature based upon the number of errors encountered during the comparison determines how soon thereafter the user terminal 16 is permitted to again attempt to access the host computer 14. If the number of errors encountered during the comparison is small, indicating that the errors may be due to extraneous factors, such as line noise or the like, the user terminal 16 will be permitted to attempt to retry accessing the host computer 14 in a relatively short period of time, for example, five seconds. However, if the number of errors encountered by the comparison is large, the user terminal 16 will be prevented from attempting to access the host computer 14 for a substantial period of time, on the order of several minutes.

Figure 2:
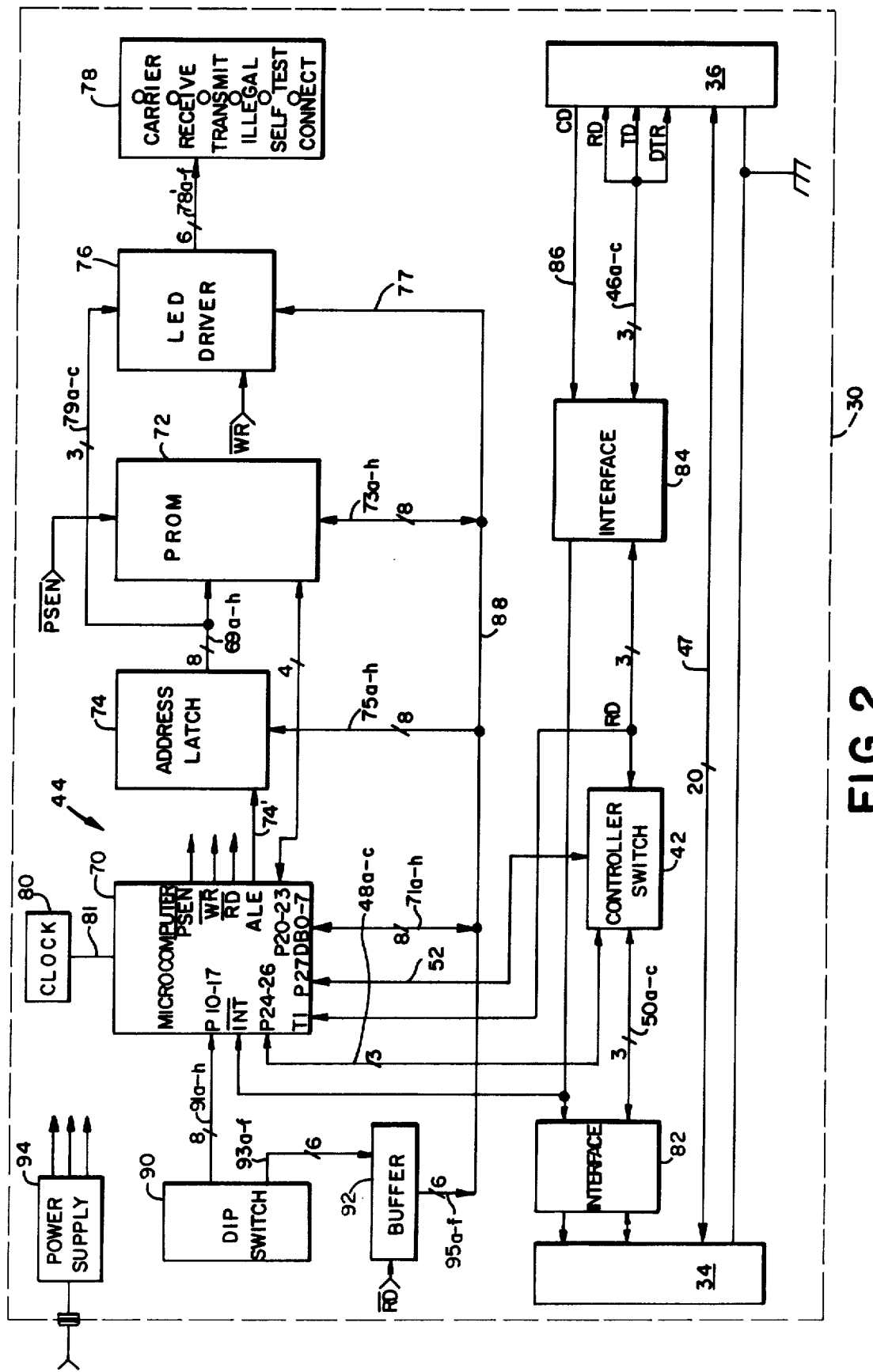
FIG. 2 is a more detailed schematic block diagram of the controller apparatus portion of FIG. 1.

Referring now to FIG. 2, there is shown a more detailed schematic block diagram of the controller apparatus 30 of FIG. 1. The accessor apparatus 32 is structurally the same as the controller apparatus with one small difference which will be described hereinafter. As discussed above, the controller apparatus 30 includes a controller switch 42 and various other components (which will be described hereinafter) which combine to form the controller computer 44. In the present embodiment, the controller switch 42 comprises a 74LS157 programmable switch which is commercially available from Texas Instruments and other component manufacturers.

The heart of the controller computer 44 is a microcomputer 70, which in this embodiment comprises a single component 8-bit microcomputer, for example, an Intel 8048 family microcomputer. A detailed discussion of the structure and operation of the 8-bit microcomputer 70 can be readily obtained from the component manufacturer. The controller apparatus 30 differs from the accessor apparatus only in stored program memory.

The controller computer 44 further includes a programmable read only memory or PROM 72, which in the present embodiment comprises a programmable device manufactured by Intel and identified by manufacturer's number 2716. The PROM 72 is a relatively permanent storage device within which is stored all of the program memory for use by the microprocessor 70, including the algorithim and the supervisory software. It is expected that the programming of all of the PROMS which will be employed in connection with a particular controller apparatus 30 and any number of accessor apparatus 32 will all be accomplished at the same time with the same software by a programming computer (not shown) in a manner well known in the art. In this manner, a controller apparatus 30 and a plurality of accessor apparatus 32 may be programmed with the same algorithm to provide a unique "lockset" which is different from other sets of controller apparatus 30 and accessor apparatus 32 having different algorithms.

An address latch 74 is also provided for the purpose of storing address information from the microprocessor 70 for use by the PROM 72 and other components. The address latch 74 is a Texas Instruments 74LS373 component, which is commercially available and known to those skilled in the art.

The controller computer 44 also includes a display for indicating the status of the access control system 12. The display comprises a light emitting diode (LED) driver 76 which is suitably connected to a plurality of light emitting diodes (LEDs) collectively shown as 78. The LED driver 76 is a standard 74LS259 component, which is commercially available from Fairchild or other component manufacturers. The purpose of the LED driver 76 is to receive and decode address information from the address latch 74 by way of lines $79a-c$ and to light one or more of the LEDs 78 by way of lines $78'a-f$ upon receipt of a write strobe $\overline{WR}$ from the microprocessor 70. For example, the "carrier" LED is lit wherever a carrier is received by the computer modem 22 and the "illegal" LED is lit whenever unacceptable access to the host computer is attempted.

A suitable crystal controlled clock 80 connected to the microcomputer 70 by lines 81 is provided to run the microcomputer 70 and to provide timing pulses for establishing the various baud rates.

The controller computer 44 also includes a suitable RS-232C to TTL interface 82 and a suitable TTL to RS-232C interface 84 for the purpose of making the requisite level adjustments to the signals passing through the controller switch 42. In the present embodiment the receive interface 82 comprises a MC 1489 component and the transmit interface 84 comprises a MC 1488 component, both components being manufactured by Motorola.

The various above described components of the controller computer 44 are all generally well known standard components which are readily obtainable from one or more semiconducter manufacturers. A detailed discussion of the structure and operation of the these components will not be presented here. Such information is readily obtainable from the particular component manufacturers.

For the sake of clarity, all of the multiple conductors lines on FIG. 2 have been shown as a single line with a numeral inserted above the line for the purpose of showing how many conductors the single line actually represents. For example, line 47 between switch terminals 34 and 36 actually represents 20 conductors as shown. In addition, subscript letters will be employed when describing multiple conductor lines for clarity.

Line 46 is actually composed of three lines; a received data line (RD) $46a$, a transmit data line (TD) $46b$ and a data terminal ready line (DTR) $46c$. When the controller switch 42 is in its first position, all three of the lines $46a-c$ are connected to the input/output ports (P24-26) of the microcomputer 70 by way of lines $48a-c$ as shown. A fourth line 52 also connects the controller switch 42 and port P27 of the microcomputer 70 for the purpose of permitting the microcomputer 70 to actuate the controller switch 42. A carrier detect line 86 is connected from the connector 36 to the T0 input port of the microcomputer 70. The carrier detect line 86 also extends to connector 34.

The controller computer 44 employs a standard multiplex address/data bus 88 which is connected by lines $71a-h$ to the data bus terminals (DB0-7) of the microcomputer 70 for the purpose of passing address information and data into and out of the microcomputer 70. The PROM 72, address latch 74 and LED driver 76 are all suitably connected to the address/data bus 88 by lines 73a-h, 75a-h and 71, respectively, as shown. The address latch 74 and LED driver 76 receive signals from the address/data bus 88 when the microcomputer 70 sends an address latch enable (ALE) signal along line 74' or a write ($\overline{WR}$) signal, respectively, to these devices. Likewise, the PROM 72 places data (i.e, instructions) on the address/data bus 88 for transmission to the microcomputer 70 upon receipt of a program store enable ($\overline{PSEN}$) signal from the microcomputer, as schematically indicated above the PROM 72.

In operation of the circuit in FIG. 2, when a user terminal 16 attempts to access the host computer 14, a carrier detect (CD) signal from the computer modem 22 is received at the input port T0 of the microcomputer 70. The CD signal causes the microcomputer 70 to transmit the above described initial ASCII code message along the transmit data (TD) line 46a to the accessor computer 56 in the matter described above. If the accessor computer 56 is present, it will echo the ASCII code message back to the controller computer 44. The echoed message is received by the microcomputer 70 along the received data (RD) line 46b. Upon receipt of the echoed message, the microcomputer 70 transmits the above-described random question along the TD line to the accessor computer 56 in the manner described above. At the same time, the microcomputer 70 obtains the stored algorithim from the PROM 72 and applies the algorithim to the random question as described above. When the accessor computer 56 has completed its application of the same algorithim to the random question, the accessor computer answer is transmitted to the microcomputer 70 along the RD line 46b. The microcomputer 70 then makes the internal bit by bit comparison of the two answers and compiles the number of incorrect bits in the manner described above. If no errors occur during the comparison, the microcomputer 70 actuates the controller switch 42 (by means of line 52) to connect the RD, TD and DTR lines 46a-c to the connector 34 (by means of three individual lines shown collectively as 50a-c) and sends a signal to the accessor computer 56 to indicate that no errors were found. The accessor computer 56 then actuates the accessor switch 54 as described above to complete the link between the user terminal 16 and the host computer 14.

In order to provide additional security, the controller computer 44, as generally designated in FIG. 2, also includes a user code extension feature, which has the capability of modifying the operation of the basic algorithim (which is permanently stored in the PROM 72) to provide for a different unique operation upon the random question. The user code extension feature is provided by means of an encoding apparatus external to the stored algorithm such as DIP (dual-in-line package) switches 90 which are comprised of 14 individual switches contained in two DIP packages of a type which are generally commercially available. By selecting different combinations of switch settings of the 14 switches, each switch having two possible positions, it is possible to provide a total of 16,384 different setting combinations. In addition to further confusing potential unauthorized attempts to access the host computer 14, the user code extension feature permits variations to be made in the access control system 12 without having to provide a new algorithim. This feature is particularly useful when one of the accessor apparatus 32 of a multiple set is lost or falls into the hands of a unauthorized user. By simply changing the dip switch settings of the controller computer 44 and all of the accessor computers 56 remaining in the hands of authorized users, the unauthorized user holding the lost or stolen accessor apparatus 32 but not knowing the new DIP switch settings is effectively prevented from gaining access to the host computer 14. As shown on FIG. 2, eight switches of the DIP switch 90 are connected by lines 91a-h directly into ports 10 through 17 of the microcomputer 70. Outputs from the other six switches of DIP switch 90 are connected by lines 93a-f to a buffer 92 and are transmitted to the address/data bus 88 along lines 95a-f when a read strobe ($\overline{RD}$) is provided to the buffer 92 by the microcomputer 70, as schematically indicated adjacent the buffer 92.

A power supply 94 including a precision regulator (not shown) is also provided for the purpose of supplying various regulated voltages to the above-described components as required. For purposes of clarity in FIG. 2, the power supply 94 is not shown as being directly connected to the various components, it being understood that the output lines from the power supply 94 are in actuality connected to all of the various components as required. A complete discussion of the structure and operation of the power supply will not be presented, as power supplies of this type are well known to those skilled in the art.

As a further enhancement to the above-described access control system 12, the accessor computer of each individual accessor apparatus 32 may be preprogrammed to maintain in storage (PROM 72) a unique identifier such as a serial number or ID number. Correspondingly, the controller computer 44 may be programmed to query or pole the accessor computer 56 (either before or after the transmission and receipt of the random question), to determine exactly which accessor apparatus 32 is attempting to access the host computer 14. The identifier information from the accessor apparatus 32 could then be transferred to the host computer 14 for various further uses. One such use of the identifier information would be to maintain a log of the total computer time utilized by a particular accessor apparatus 32 (i.e., the individual controlling the particular accessor apparatus) for billing or other record keeping purposes. Another use of such identifier information would be to allow the host computer 14 to regulate the amount of computer time to be allocated to a particular individual, for example on a weekly or monthly basis or to regulate the information available to the particular operator. Another use of such identifier information is to selectively allow or disallow certain accessor apparatus 32 from accessing selected portions of the host computer 14 or to identify specific lost or stolen accessor apparatus 32.

Figure 3:
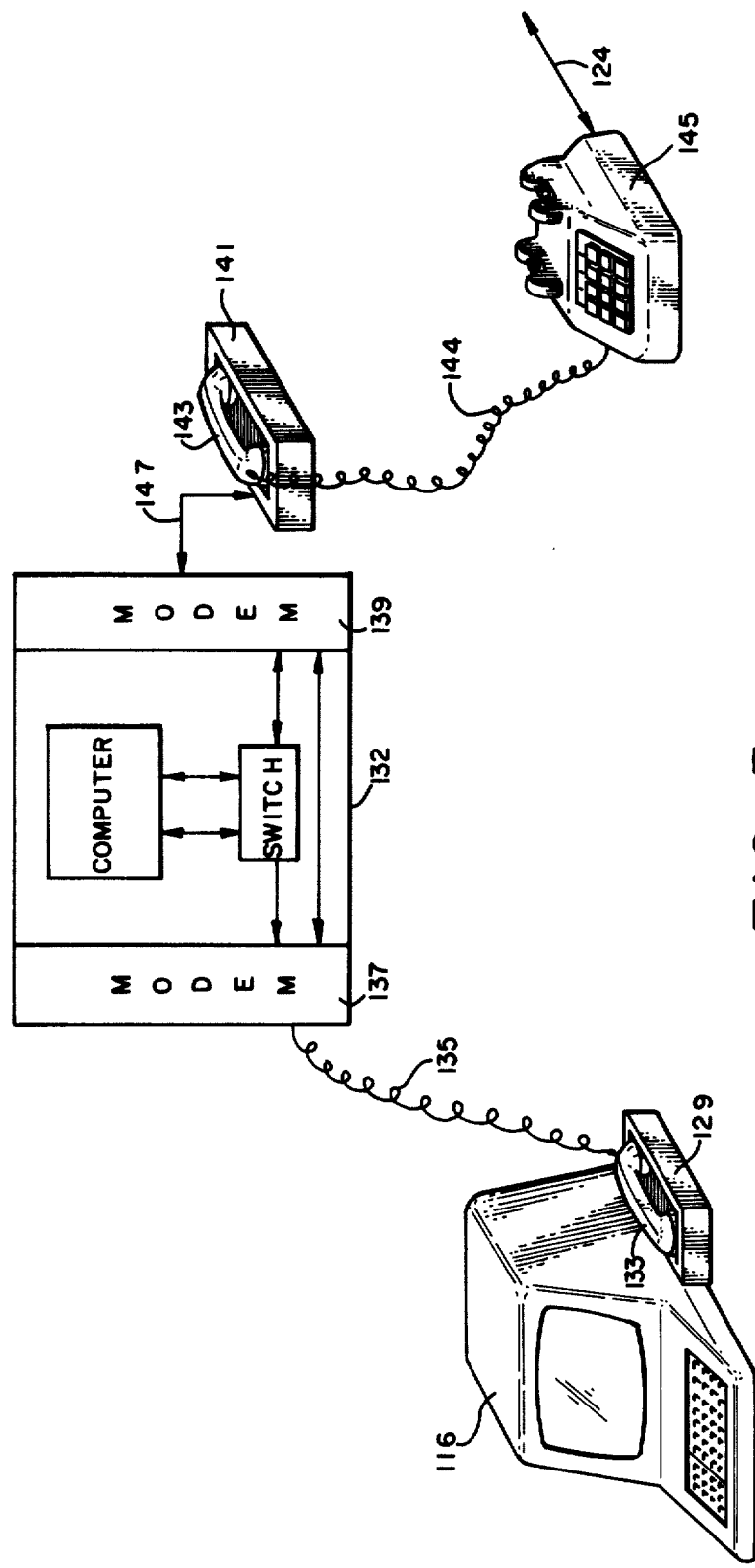
FIG. 3 is a schematic block diagram of the system of FIG. 1 showing an alternate method for connecting the access controller of FIG. 1 into the data processing system employing an acoustic coupler.

FIG. 3 shows a slight variation of the accessor apparatus portion of the access control system 12 of FIG. 1. The accessor apparatus 132 of FIG. 3 is employed in connection with a user terminal 116 having an acoustical telephone cup connection 129, rather than the RS-232C type connection described above in relation to FIG. 1. The controller apparatus 30, host computer 14 and computer modem 22 remain the same as in FIG. 1.

As shown on FIG. 3, the accessor apparatus 132 includes a telephone type receiver 133 for interfacing with the acoustic telephone cup connector 129. The telephone receiver 133 is connected by a line 135 and a standard telephone type connector such as a modular connector (not shown) to the accessor apparatus 132 through a suitable interfacing modem 137. Correspondingly, the accessor apparatus 132 is connected through a suitable interfacing modem 139 and line 147 to a second acoustical telephone cup coupling 141. The handset 143 of a standard telephone 145 is employed to provide a telephone line 124 connection to the computer modem (not shown) and the remaining portions of the data processing system 10 in the same manner as shown on FIG. 1. Alternatively, the standard telephone 145 could be wired directly to the modem 139 (without employing the handset 143) by utilizing standard telephone type connectors, such as modular connectors (not shown) on each end of line 144.

From the foregoing description and the accompanying figures, it can be seen that the present invention provides an economical and efficient method and apparatus for controlling access to a data transmission system, particularly a data processing system. It will be recognized by those skilled in the art that changes or modifications may be made to the above-described embodiment without departing from the broad inventive concepts of the invention. It is understood, therefore, that this invention is not limited to the particular embodiment described, but it is intended to cover all changes and modifications which are within the scope and spirit of the invention as set forth in the appended claims.

We claim:

1. A computer access control system for a data processing system including a host computer (14) to be accessed, at least one user terminal (16) for accessing the host computer, and transmission means (18) affording communication between the host computer and the user terminal, comprising
   (a) controller switch means (42) connected between the transmission means and the host computer, said controller switch means being operable between a normal first position and a second position;
   (b) first computer means (44) connected with said controller switch means for switching said controller switch means between its first and second positions, respectively, said controller switch means when in its normal first position permitting transmission of electrical signals between the transmission means and said first computer means and said controller switch means when in its second position permitting transmission of electrical signals between the transmission means and the host computer;
   (c) accessor switch means (54) connected between the transmission means and the user terminal, said accessor switch means being operable between a normal first position and a second position;
   (d) second computer means (56) connected with said accessor switch means for switching said accessor switch means between its first and second positions, respectively, said accessor switch means when in its normal first position permitting transmission of electrical signals between the transmission means and the user terminal, said first and second computer means switching said controller and accessor switch means respectively to their first positions upon operation of the user terminal, thereby to permit transmission of electrical signals between said first and second computer means;
   (e) said first computer means including
      (1) memory means storing a given algorithm; and
      (2) microcomputer means for generating and transmitting a random question signal in response to operation of the user terminal; and
   (f) said second computer means including
      (1) memory means storing said given algorithm; and
      (2) microcomputer means for receiving said random question signal and for generating and transmitting an answer signal in response to said random question signal, said first computer microcomputer means also generating an answer signal in response to said random question signal, said first computer microcomputer means comparing said answer signals, said first computer means switching said controller switch means to its second position and said second computer means switching said accessor switch means to its second position when said answer signals are the same, thereby to permit transmission of electrical signals between the user terminal and the host computer.

2. Apparatus as defined in claim 1, wherein said first computer means includes means for preventing transmission of electrical signals between the host computer and the transmission means for a predetermined period of time when said answer signals are different.

3. Apparatus as defined in claim 2, wherein said predetermined period of time is proportional to the number of differences between said answer signals.

4. Apparatus as defined in claim 1, wherein said first computer means switches said controller switch means to its first position when said answer signals are different, thereby to prevent unauthorized communication between the user terminal and the host computer.

5. Apparatus as defined in claim 1, wherein said first and second computer means each include user code extension means for modifying said algorithms in the same manner.

6. Apparatus as defined in claim 5, wherein each of said user code extension means comprises an external coding device.

7. Apparatus as defined in claim 1, wherein said first computer microcomputer means further includes means for generating a message signal prior to transmitting said random question signal, said message signal being transmitted to said second computer means, said second computer microcomputer means retransmitting said message signal to said first computer means to provide an indication that said second computer means is present and operable.

8. Apparatus as defined in claim 7, wherein said message signal is received and displayed by the user terminal when said accessor switch means and said second computer means are absent.

9. Apparatus as defined in claim 1, and further comprising multi-conductor cables for connecting said controller switch means with the host computer and the transmission means and for connecting said accessor switch means with the user terminal and the transmission means.

10. Apparatus as defined in claim 20, and further comprising acoustic coupler means for connecting said accessor switch means with the user terminal.

11. Apparatus as defined in claim 20, wherein said second computer memory means further stores a unique identifier signal, said first computer means being operable to query and obtain said identifier signal from said second computer memory means.

12. A method for controlling the access to a host computer from a user terminal via transmission means of a data processing system, comprising
   (a) establishing a first communication link between a controller computer connected between the host computer and the transmission means and an accessor computer connected between the user terminal and the transmission means upon operation of the user terminal;
   (b) storing the same algorithm in said controller and accessor computers;
   (c) generating a random question signal in said controller computer;
   (d) transmitting said random question signal from said controller computer to said accessor computer;
   (e) generating a first answer signal in said controller computer in response to said random question signal;
   (f) generating a second answer signal in said accessor computer in response to said random question signal;
   (g) transmitting said second answer signal from said accessor computer to said controller computer;
   (h) comparing said first and second answer signals in said controller computer; and
   (i) establishing a second communication link between the user terminal and the host computer when the first and second answer signals are the same, thereby indicating that the user terminal is authorized to access the host computer.

* * * * *